United States Patent Office 3,052,740
Patented Sept. 4, 1962

3,052,740
PREPARATION OF PROPADIENE
Marion C. Day, Jr., Baton Rouge, La., assignor to The Dow Chemical Company, Midland, Mich., a corporation of Delaware
No Drawing. Filed Sept. 30, 1960, Ser. No. 59,488
7 Claims. (Cl. 260—680)

This invention relates to the preparation of propadiene. More particularly, it pertains to the conversion of methyl acetylene to propadiene by the use of an aluminate catalyst.

While methyl acetylene is produced as a by-product in a number of processes, the demand for the product is somewhat limited. Thus, it is greatly desirable to provide a process whereby the methyl acetylene may be converted to propadiene which is finding considerable use in the polymerization field.

It is therefore an object of this invention to provide a process for the preparation of propadiene from methyl acetylene.

The above and other objects are attained according to the invention by passing methyl acetylene in a vapor phase at a temperature in the range of 200° to 400° C. into contact with an aluminate catalyst, such as sodium or potassium aluminate, to convert the methyl acetylene to propadiene and then recovering the propadiene from the reaction mixture. Upon passing the methyl acetylene into contact with an aluminate catalyst, methyl acetylene is converted to propadiene substantially without the formation of by-products.

The various known methods of contacting a gaseous reactant with a solid catalyst may be used in the process. The most convenient way is to have the catalyst in a heated fixed bed and to pass the methyl acetylene through the bed. The effluent from the reactor or bed, which consists essentially of propadiene and unreacted methyl acetylene, is processed most conveniently by distillation to separate the propadiene from the unreacted methyl acetylene. The unreacted methyl acetylene is then recycled through the reactor. By recycling, substantially all of the methyl acetylene can be converted to propadiene.

The catalyst used may be in the form of granules or particles of the aluminate or the alluminate may be dispersed upon an inert carrier, such as diatomaceous earth, asbestos, and other known inert carriers. Where the aluminate is deposited upon a carrier, the catalyst is prepared by impregnating the carrier with a solution of the aluminate and heating the impregnated mass at a temperature in the range of 90° to 200° C. to evaporate the water from the solution and deposit the aluminate upon the carrier. The aluminate solution may be prepared by reacting aluminum with a sodium hydroxide or potassium hydroxide solution or dissolving the aluminate salt.

The reaction is carried out at a temperature in the range of 200° to 400° C. with 300° to 325° C. being preferred. Below 200° C. the reaction rate is not very rapid, while above 400° C. some decomposition or cracking of methyl acetylene may be obtained. At the preferred temperatures the reaction is sufficiently rapid so that a space velocity of as high as 1000 may be used. By the term "space velocity" it is meant the volumes of methyl acetylene, measured at 20° C. and 760 millimeters, passed through the reactor per hour per unit volume of catalyst filled space in the reactor. Generally a space velocity in the range of 300 to 800 is employed. Although a pressure above or below atmospheric may be used for the reaction, generally the methyl acetylene is close to atmospheric pressure when it is contacted with the catalyst. Sufficient pressure is only used to obtain the desired velocity of flow through the reactor.

To further illustrate the invention, a series of runs was made where methyl acetylene was passed through an electrically heated reactor containing an aluminate catalyst. The catalyst was prepared by reacting approximately stoichiometric amount of an aluminum foil with ½ gram of potassium or sodium hydroxide in 50 to 60 millimeters of water. After the aluminum foil had reacted with the hydroxide, the solution was mixed with diatomaceous earth and dried over night at a temperature of around 110° C. Forty millimeters of the catalyst thus obtained was placed in the reactor.

The methyl acetylene was passed through the bed at a pressure just high enough to maintain the desired flow. The effluent was discharged from the reactor at atmospheric pressure and was analyzed by chromatography.

The catalyst used and other pertinent details and results obtained are shown in the table below.

| Run | Reaction Temp., °C. | Space Velocities, hr. | Catalyst | | Reactor Effluent, Volume Percent | |
|---|---|---|---|---|---|---|
| | | | Carrier | Aluminate Solution used to Impregnate Carrier | Methyl Acetylene | Propadiene |
| Blank | 290 | 91 | Diatomaceous earth | None | 100 | detected |
| 1 | 293 | 110 | ___do___ | $NaAlO_2$ | 79.3 | 20.6 |
| 2 | 364 | 465 | ___do___ | $NaAlO_2$ | 77.4 | 22.0 |
| 3 | 344 | 374 | ___do___ | $KAlO_2$ | 79.0 | 21.0 |

Similar results were obtained when the carrier was impregnated with a solution made by dissolving 1 gram of $Na_2(AlO_2)_2 \cdot 3H_2O$ in 60 ml. of water.

In addition to the runs above, sodium aluminate was broken into small granules or chips and 40 millimeters were placed in the reactor. Methyl acetylene was passed through the reactor at a space velocity of 302 and at a temperature of 344° C. A product containing substantially 22 percent propadiene and the remainder methyl acetylene was obtained.

What is claimed is:
1. A process for the preparation of propadiene from methyl acetylene, which comprises passing methyl acetylene in a vapor phase at a temperature in the range of 200° to 400° C. into contact with an aluminate catalyst selected from the group consisting of sodium aluminate and potassium aluminate and recovering the propadiene from the reaction mixture.

2. A process according to claim 1 wherein the aluminate is sodium aluminate.

3. A process according to claim 1 wherein the aluminate is potassium aluminate.

4. A process for the preparation of propadiene from methyl acetylene, which comprises passing methyl acetylene in a vapor phase at a temperature in the range of 300° to 325° C. into contact with an aluminate catalyst selected from the group consisting of sodium aluminate and potassium aluminate and recovering the propadiene from the reaction mixture.

5. A process for the preparation of propadiene from methyl acetylene, which comprises passing methyl acetylene in a vapor phase at a temperature in the range of 300° to 325° C. into contact with sodium aluminate in particulate form as catalyst to convert the methyl acetylene to propadiene, and recovering the propadiene from the reaction mixture.

6. A process for the preparation of propadiene from methyl acetylene, which comprises passing methyl acetylene in a vapor phase at a temperature in the range of 300° to 325° C. into contact with sodium aluminate as catalyst deposited upon an inert carrier to convert the methyl acetylene to propadiene, and recovering the propadiene from the reaction mixture.

7. A process for the preparation of propadiene from methyl acetylene, which comprises passing methyl acetylene in a vapor phase at a temperature in the range of 300° to 325° C. into contact with potassium aluminate deposited on an inert carrier as catalyst to convert the methyl acetylene to propadiene, and recovering the propadiene from the reaction mixture.

References Cited in the file of this patent

UNITED STATES PATENTS

| | | |
|---|---|---|
| 1,083,165 | Webel | Dec. 30, 1913 |
| 2,325,398 | Hearne et al. | July 27, 1943 |

OTHER REFERENCES

"Faraday's Encyclopedia of Hydrocarbon Compounds," published by Chemindex (London), 1957 (vol. 1a, page 03003.00.01 relied on).